United States Patent
Kido

(10) Patent No.: US 6,980,798 B2
(45) Date of Patent: Dec. 27, 2005

(54) AUTOMATIC E-MAIL TRANSMITTING METHOD AND MOBILE TERMINAL APPARATUS AND RADIO MOBILE TERMINAL APPARATUS FOR THE SAME

(75) Inventor: Toru Kido, Tokyo (JP)

(73) Assignee: NEC Corporation, Tokyo (JP)

( * ) Notice: Subject to any disclaimer, the term of this patent is extended or adjusted under 35 U.S.C. 154(b) by 606 days.

(21) Appl. No.: 10/011,745

(22) Filed: Dec. 11, 2001

(65) Prior Publication Data
US 2002/0077081 A1    Jun. 20, 2002

(30) Foreign Application Priority Data
Dec. 14, 2000    (JP)    ............................... 2000-380016

(51) Int. Cl.⁷ ............................ H04Q 7/24; H04B 5/00; H04M 3/42
(52) U.S. Cl. ................................... 455/412.1; 455/557
(58) Field of Search ............................ 455/412.1–415, 455/466, 556–557; 709/200, 204, 206

(56) References Cited

U.S. PATENT DOCUMENTS

| 5,991,639 | A | 11/1999 | Rautiola et al. | |
| 6,356,762 | B1 * | 3/2002 | Guenther | 455/456.4 |
| 6,377,793 | B1 * | 4/2002 | Jenkins | 455/412.1 |
| 2002/0082665 | A1 * | 6/2002 | Haller et al. | 607/60 |
| 2002/0094787 | A1 * | 7/2002 | Avnet et al. | 455/68 |
| 2003/0045275 | A1 * | 3/2003 | McDonagh et al. | 455/414 |

FOREIGN PATENT DOCUMENTS

| EP | 0701359 A1 | 8/1995 |
| EP | 0833492 A2 | 9/1997 |
| JP | 2001-154944 | 6/2001 |
| WO | WO 01/82526 A2 | 11/2001 |

OTHER PUBLICATIONS 2002-055375, Dec. 2002, Derwent, Patent Family Data.*

* cited by examiner

Primary Examiner—Roland G. Foster
(74) Attorney, Agent, or Firm—Whitham, Curtis & Christofferson, PC

(57) ABSTRACT

In an e-mail transmitting method, a radio mobile terminal apparatus and a mobile terminal apparatus are connected to establish a communication channel. Transmission scheduled e-mails produced in the mobile terminal apparatus are automatically transmitted from the mobile terminal apparatus to the radio mobile terminal apparatus through the communication channel once the establishment of the communication channel is detected. The transmission scheduled e-mails received from the mobile terminal apparatus are automatically transmitted from the radio mobile terminal apparatus to a mail server through a base station using it's radio communication function.

8 Claims, 7 Drawing Sheets

Fig. 5
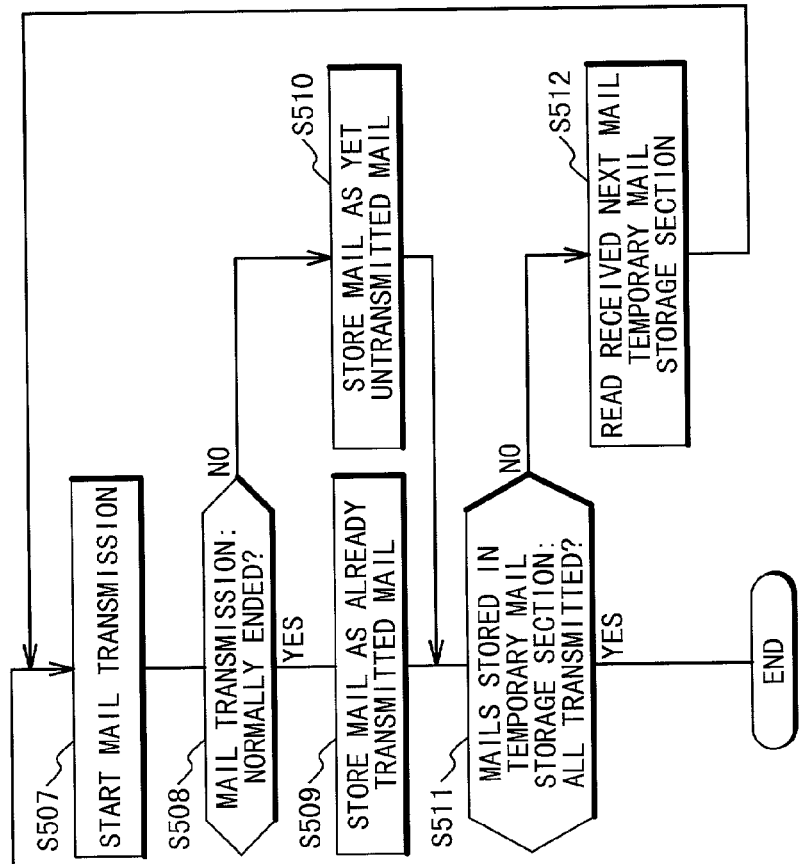
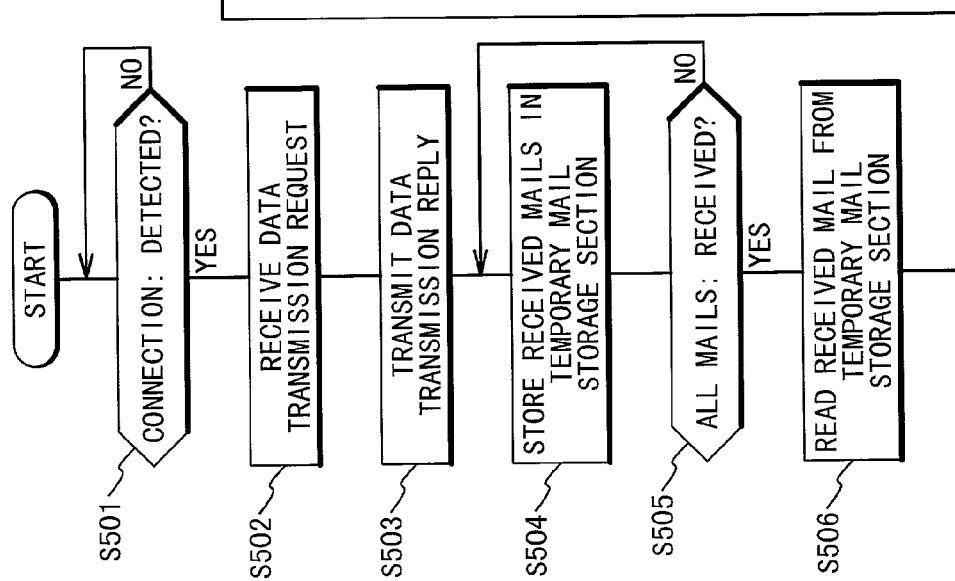

AUTOMATIC E-MAIL TRANSMITTING METHOD AND MOBILE TERMINAL APPARATUS AND RADIO MOBILE TERMINAL APPARATUS FOR THE SAME

BACKGROUND OF THE INVENTION

1. Field of the Invention

The present invention relates to an e-mail transmitting method, a radio mobile terminal apparatus and mobile terminal apparatus for the same. More particularly, the present invention relates to an e-mail transmitting method, a radio mobile terminal apparatus and a mobile terminal apparatus, in which e-mails are automatically transmitted from the radio mobile terminal apparatus such as a mobile phone with which the mobile terminal apparatus can be connected, and the e-mails are automatically transmitted from the mobile terminal apparatus to the radio mobile terminal apparatus and then are automatically transmitted from the radio mobile terminal apparatus to a mail server.

2. Description of the Related Art

In recent years, a mobile phone as a radio mobile terminal apparatus has been popular to the extent that the number of mobile phones exceeds the number of fixed type telephones which are connected with telephone lines. Moreover the mobile phone has an e-mail transmitting function and a function for connecting with the Internet, and can achieve a communication function other than a telephone function. In the mobile phone, an e-mail is produced using keys provided for the operation surface of the mobile phone. The keys are Kana characters, alphanumeric characters, or symbols. However, the production of a sentence using a limited number of keys (for example, 12 keys) is complicated for a user who is not familiar with a key operation.

Also, a mobile terminal apparatus such as PDA is commercially available which has a keyboard with the size and the number of keys suitable for character input, and a relatively large display, compared with the mobile phone. The mobile terminal apparatus has a memo book function, a schedule managing function, a calendar function, and a word processor function but has no radio section for connection with a base station. By connecting the mobile terminal apparatus with the radio mobile terminal apparatus such as the mobile phone, the produced e-mail can be transferred to the mobile phone.

For example, in Japanese Laid Open Patent Application (JP-P2000-49965A), a transmitting and receiving card can be attached to both of a mobile phone and an e-mail terminal. An e-mail is produced in the e-mail terminal to which the transmitting and receiving card is attached, and when the transmitting and receiving card is attached to the mobile phone after the e-mail is stored in the transmitting and receiving card, the e-mail is automatically transmitted from the mobile phone when a good electromagnetic wave situation is confirmed.

Also, in case of the radio mobile terminal apparatus such as the mobile phone, there is a case that a middle portion of the speech is pulled-out or broken during the conversation and a part of data is passed away or a part of the e-mail is not transmitted in the data transmission. For this reason, in an e-mail method and a radio communication apparatus disclosed in Japanese Laid Open Patent application (JP-A-Heisei 11-169320) and the Japanese Laid Open Patent Application (JP-P2000-201223A), electric wave situation is monitored, the e-mail transmission is interrupted or suspended, when the electric wave situation is degraded, and the transmission is restarted or the e-mail is retransmitted when the electric wave situation is improved.

However, according to the conventional e-mail transmitting method, when the e-mail produced by the e-mail terminal or mobile terminal apparatus is transmitted, the e-mail terminal is connected with the radio mobile terminal apparatus, and an operation is carried out to receive the e-mail. Then, a key operation is carried out, and an operation is carried out to transmit the e-mail to a server. The key operations in this case are required in both of the e-mail terminal and the radio mobile terminal apparatus, and the twice operation is required for transmission and reception. Therefore, the operability is very bad.

Also, according to Japanese Laid Open Patent Application (JP-P2000-49965A), it is necessary that both of the e-mail terminal and the radio mobile terminal apparatus have functions to enable the transmitting and receiving cards to be attached. Therefore, models of the e-mail terminal and radio mobile terminal apparatus are restricted.

In Japanese Laid Open Patent application (JP-A-Heisei 11-169320) and Japanese Laid Open Patent Application (JP-P2000-201223A), the improvement of the reliability of the e-mail transmission in the only radio mobile terminal apparatus is aimed and there is no description about an elimination plan of the problem when the e-mail terminal is connected.

Also, a portable communication system is disclosed in Japanese Laid Open Patent Application (JP-P2000-181822A). In this reference, a portable data transmitting and receiving terminal apparatus has a communication section for carrying out radio communicating with another terminal automatically, a temporary storage section for storing received data at least, and a display section for displaying the receive data at least. A processing section automatically transmits the data stored in the temporary storage section to the other terminal existing in a communication possible area of the communication section, and automatically receives the data transmitted from the other terminal in the communication possible area to store in the temporary storage section. The processing section controls the display section to display the data stored in the temporary storage section.

Also, an e-mail terminal system is disclosed in Japanese Laid Open Patent Application (JP-Heisei 7-79248). In this reference, the mobile terminal is composed of a an e-mail terminal main body which transmits and receives an e-mail to and from a center through a channel, a reception memory provided to have a connection or no connection with the main body and to store the received e-mail, a display panel, and a display processing section for displaying the e-mail on the display panel. When the mobile terminal is connected with the e-mail terminal main body, the main body connects a channel with the center and receives an e-mail with a destination ID for the mobile terminal to store in the memory. When the mobile terminal is separated from the main body, the display processing section displays the e-mail on the display panel in response to an instruction.

Also, a radio e-mail system is disclosed in Japanese Laid Open Patent Application (JP-P2000-201223A). In this reference, a mobile e-mail terminal has a radio wave monitoring section, and stops or interrupts the transmission of an e-mail when the monitoring section detects bad radio wave state during or in the transmission of the e-mail and re-transmits the e-mail after the radio wave state becomes good.

SUMMARY OF THE INVENTION

Therefore, an object of the present invention is provide an e-mail transmitting method in which a mobile terminal apparatus which has an e-mail producing function and an e-mail managing function but does not have a radio section is connected with a radio mobile terminal apparatus and a process for the e-mail transmission is automatically carried out.

Also, another object of the present invention is to provide a radio mobile terminal apparatus which automatically transmits produced e-mails and automatically transmits received e-mails to a mail server, when a mobile terminal apparatus which has an e-mail producing function and an administrating function but does not have a radio section is connected.

Moreover, another object of the present invention is to provide a mobile terminal in which an e-mail transmitting process is automatically carried out when it is connected with a radio mobile terminal apparatus and e-mail data is transmitted.

In an aspect of the present invention, an e-mail transmitting method is achieved by (a) connecting a radio mobile terminal apparatus and a mobile terminal apparatus to establish a communication channel therebetween, the radio mobile terminal apparatus having a radio communication function; by (b) detecting the establishment of the communication channel between the mobile terminal apparatus and the radio mobile terminal apparatus; by (c) automatically transmitting transmission scheduled e-mails produced in the mobile terminal apparatus, from the mobile terminal apparatus to the radio mobile terminal apparatus through the communication channel in response to the detection of the establishment of the communication channel; and by (d) automatically transmitting the transmission scheduled e-mails received from the mobile terminal apparatus, from the radio mobile terminal apparatus to a mail server through a base station using the radio communication function.

Here, the (a) connecting step may include the step of: connecting the radio mobile terminal apparatus and the mobile terminal apparatus by connectors directly or through a cable.

Also, the communication channel may be one of a radio channel, an infrared ray channel, a visible light beam channel, and a supersonic wave channel.

The (c) automatically transmitting step may be achieved by (e) transmitting a request signal from the mobile terminal apparatus to the radio mobile terminal apparatus in response to the detection of the establishment of the communication channel; by (f) transmitting an acceptance reply from the radio mobile terminal apparatus to the mobile terminal apparatus in response to reception of the request; and by (g) automatically transmitting the transmission scheduled e-mails from the mobile terminal apparatus to the radio mobile terminal apparatus.

The (f) transmitting step may be achieved by checking whether the radio mobile terminal apparatus is in a service area of the base station; and by transmitting the acceptance reply from the radio mobile terminal apparatus to the mobile terminal apparatus in response to reception of the request, when it is determined that the radio mobile terminal apparatus is in a service area of the base station.

In this case, the (f) transmitting step further may be achieved by transmitting a refusal replay from the radio mobile terminal apparatus to the mobile terminal apparatus in response to the reception of the request, when it is determined that the radio mobile terminal apparatus is not in a service area of the base station; and by stopping the transmission of the transmission scheduled e-mails from the mobile terminal apparatus to the radio mobile terminal apparatus.

The (d) automatically transmitting the received transmission scheduled e-mails further may include the step of: storing the received transmission scheduled e-mails in the radio mobile terminal apparatus.

In another aspect of the present invention, a radio mobile terminal apparatus includes a coupling device, a detecting unit, a first communication section, a second communication section, a memory and a control unit. The coupling device connects the radio mobile terminal apparatus with an external apparatus such that a communication channel is established between the radio mobile terminal apparatus and the external apparatus. The detecting unit detects the establishment of the communication channel between the radio mobile terminal apparatus and the external apparatus. The first communication section communicates with the external apparatus through the communication channel. The second communication section has an antenna and communicates with a mail server through the antenna and a base station. The control unit receives scheduled e-mails from the external apparatus by the first communication section to store in the memory when the detecting unit detects the establishment of the communication channel by the coupling device, and transmits the stored e-mails to the mail server by the second communication section when the reception of the transmission scheduled e-mails are completed.

Here, the radio mobile terminal apparatus further may include an area determining section which determines whether the radio mobile terminal apparatus is in a service area of the base station. In this case, the control unit may control the first communication section to receive the transmission scheduled e-mails from the external apparatus, when it is determined by the area determining unit that the radio mobile terminal apparatus is in the service area of the base station. Also, the control unit may control the first communication section to refuse the reception of the transmission scheduled e-mails from the external apparatus when it is determined by the area determining section that the radio mobile terminal apparatus is not in the service area of the base station.

Also, the communication channel may be either one of a radio channel, an infrared ray channel, a visible light beam channel, and a supersonic wave channel.

In further another aspect of the present invention, a mobile terminal apparatus includes a coupling device, a detecting unit, a communication section, a memory, a key operation section, and a control unit. The coupling device connects the mobile terminal apparatus with a radio mobile terminal apparatus such that a communication channel is established between the radio mobile terminal and the external apparatus. The detecting unit detects the establishment of the communication channel between the radio mobile terminal apparatus and the external apparatus. The communication section communicates with the external apparatus through the communication channel. The key operation section inputs characters. The control unit produces each of e-mails based on characters and storing the produced e-mails in the memory as transmission scheduled e-mails, and automatically reads out the transmission scheduled e-mails from the memory to transmit to the radio mobile terminal apparatus when the establishment of the communication channel is detected by the detecting unit, and a reply to a request is returned from the radio mobile terminal apparatus, the request having been transmitted from the mobile terminal apparatus to the radio mobile terminal apparatus.

Also, the control unit stops the transmission of the transmission scheduled e-mails when the reply is not returned from the radio mobile terminal apparatus.

Also, the communication channel may be either one of a radio channel, an infrared ray channel, a visible light beam channel, and a supersonic wave channel.

BRIEF DESCRIPTION OF THE DRAWINGS

FIG. 5 is a flow chart showing the operation of a control unit of the radio mobile terminal apparatus when it is connected with the mobile terminal apparatus;

DESCRIPTION OF THE PREFERRED EMBODIMENTS

Hereinafter, an e-mail transmitting method of the present invention will be described with reference to the drawings.

Figure 1:
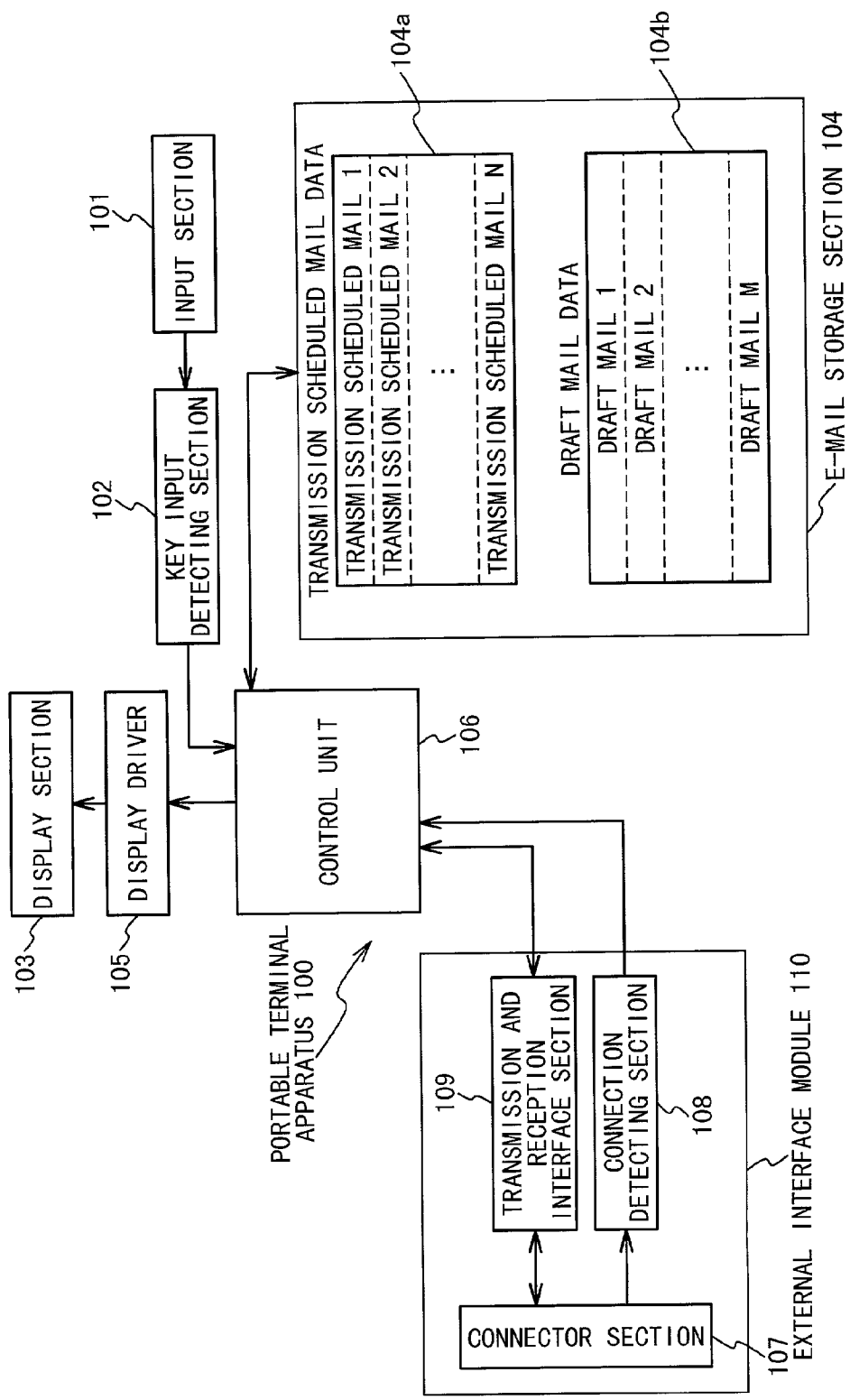
FIG. 1 is a block diagram showing the circuit structure of a mobile terminal apparatus according to the present invention.
Figure 2:
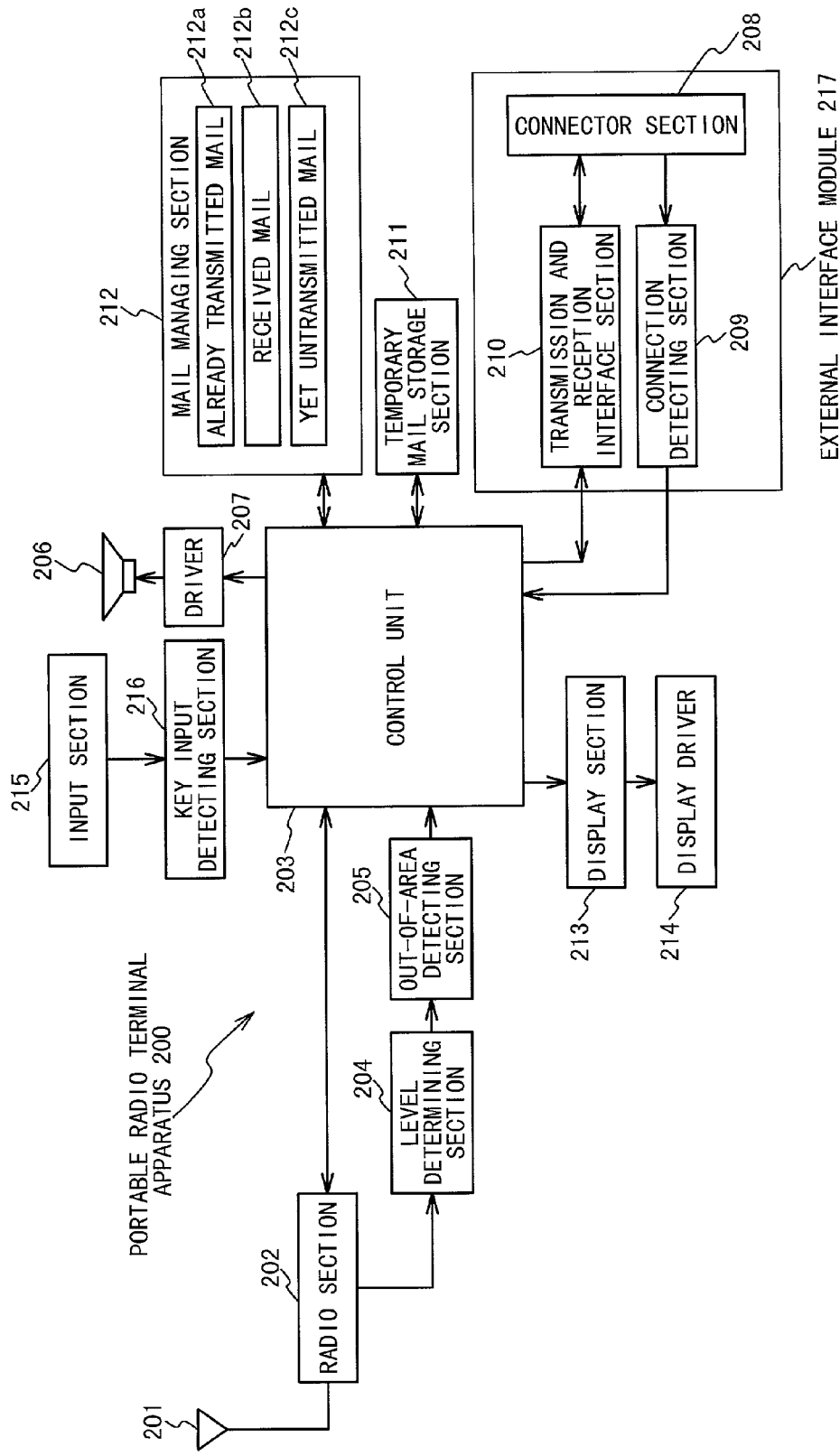
FIG. 2 is a block diagram showing the circuit structure of a radio mobile terminal apparatus according to the present invention.

FIG. 1 shows the circuit structure of a mobile terminal apparatus of the present invention. FIG. 2 shows the circuit structure of a radio mobile terminal apparatus such as a mobile phone of the present invention.

As shown in FIG. 1, the mobile terminal apparatus 100 as an external apparatus is composed of an input section 101, a key input detecting section 102, a display section 103, an e-mail storage section 104, a display driver 105, a control unit 106, a connector section 107, a connection detecting section 108 and a transmitting and receiving interface section 109. Here, an external interface module 110 is formed by the connector section 107, the connection detecting section 108 and the transmitting and receiving interface section 109.

The input section 101 is composed of plurality of keys to enable a user to easily carry out a character inputting operation, and is used when the character inputting operation and a storing operation of a produced e-mail are carried out. The key input detecting section 102 determines which key of the input section 101 is pushed and outputs the content to the control unit 106. The display section 103 carries out the displays of characters inputted by the input section 101 and an operation of storage of the e-mail data.

The e-mail storage section 104 stores the produced e-mail, and transmission scheduled e-mail data 104a (of transmission scheduled e-mails 1 to N which are automatically transmitted when the connection with the radio mobile terminal apparatus 200 of FIG. 2 is established) and draft e-mail data 104b (of draft e-mails 1 to N which are not automatically transmitted). The attributes of the transmission scheduled e-mail data 104a and draft e-mail data 104b are specified through the input section 101 by the user every time the user stores the produced e-mail, and separately is stored in the e-mail storage section 104.

The control unit 106 controls the identification of the inputted character and the display of the inputted character through the display driver 105 based on the detection result by the key detecting section 102. Also, the control unit 106 has a word processor function to produce an e-mail, and stores the produced e-mail in the e-mail storage section 104 in accordance with the attribute specified by the user using the input section 101.

The connection detecting section 108 detects whether or not a connector is engaged with the connector section 107, and outputs a detection signal to the control unit 106 when detecting the connection. The transmitting and receiving interface section (hereinafter, to be referred to as a "transmitting and receiving IF section") 109 outputs the data received externally through the connector section 107 to the control unit 106. In addition, the transmitting and receiving IF section 109 transmits the data outputted from the control unit 106, to the outside of the apparatus through the connector section 107.

Next, the circuit structure of the radio mobile terminal apparatus 200 of FIG. 2 will be described. Here, the radio mobile terminal apparatus 200 will be described using a mobile phone with an e-mail transmitter function as an example.

The mobile phone is composed of an antenna 201, a radio section 202, a control unit 203, a level determining section (electric field strength detecting section) 204, an out-of-area detecting section 205, a speaker 206, a driver 207, a connector section 208, a connection detecting section 209, a transmitting and receiving IF section 210, an e-mail temporary storage section 211 such as a semiconductor memory, an integrated circuit memory, a hard disk or the like, an e-mail managing section 212, a display driver 213, a display section 214, an input section 215 and a key input detecting section 216. The connector section 208, the connection detecting section 209 and the transmitting and receiving IF section 210 form an external interface module 217.

The radio section 202 amplifies and demodulates a signal received by the antenna 201, and outputs to the control unit 203. Also, the radio section 202 modulates a signal supplied from the control unit 203 as transmission data, and outputs to the antenna 201 as a transmission output, after carrying out necessary processing. The level determining section 204 A/D-converts analog reception electric field strength outputted from the radio section 202 by an internal analog-to-digital converter, and outputs to the out-of-area detecting section 205 as a reception electric field value. The out-of-area detecting section 205 compares the output of the level determining section 204 and a previously set out-of-area threshold and detects whether or not the mobile phone is in a service area. When either of the reception electric field values from a base station or base stations around this base station is higher than the threshold, the mobile phone is determined to be in the service area. When all of reception electric fields from the base stations are lower than the threshold, the mobile phone is determined to be out of the service area.

The control unit 203 manages the transmission and reception of communication data, in addition to the designation of a radio channel to radio section 202 and the control of operation timings. Also, the control unit 203 carries out the connection control with a mail server (not shown) on a network such as the Internet (not shown). Also, the control unit 203 executes the transmitting and receiving control of data with the mail server. Also, the control unit 203 drives the speaker 206 to generate a call arrival notice sound when detecting that there is a call arrival and data of the mobile phone based on the demodulated data from the radio section 202. The driver 207 drives the speaker 206. The frequency and sound volume of the arrival notice sound are set by the control unit 203. The received e-mail is displayed on the display section 214 by the display driver 213. Moreover, the control unit 203 displays the determining result of whether the radio mobile terminal apparatus 200 is in the service area or out of the service area at present, on the display section 214 with characters or a picture by the display driver 213 based on the output of the out-of-area detecting section 205 to inform to the user.

The connection detecting section 209 detects that the mobile terminal apparatus 100 is connected when the connector section 107 of the mobile terminal apparatus 100 is engaged with the connector section 208. The connection detecting section 209 outputs a detection signal to the control unit 203, when detecting the connection. The transmitting and receiving IF section 210 transmits received data from the mobile terminal apparatus 100 to the control unit 203 through the connector 208. The control unit 203 stores the received data in the e-mail temporary storage section 211. The e-mail temporary storage section 211 executes a storing process until all the received e-mail data are stored. The e-mail managing section 212 is composed of a storage medium which stores the already transmitted e-mails 212a, received e-mails 212b received from the mail server and yet untransmitted e-mails 212c which are failed in the transmission.

Figure 3:
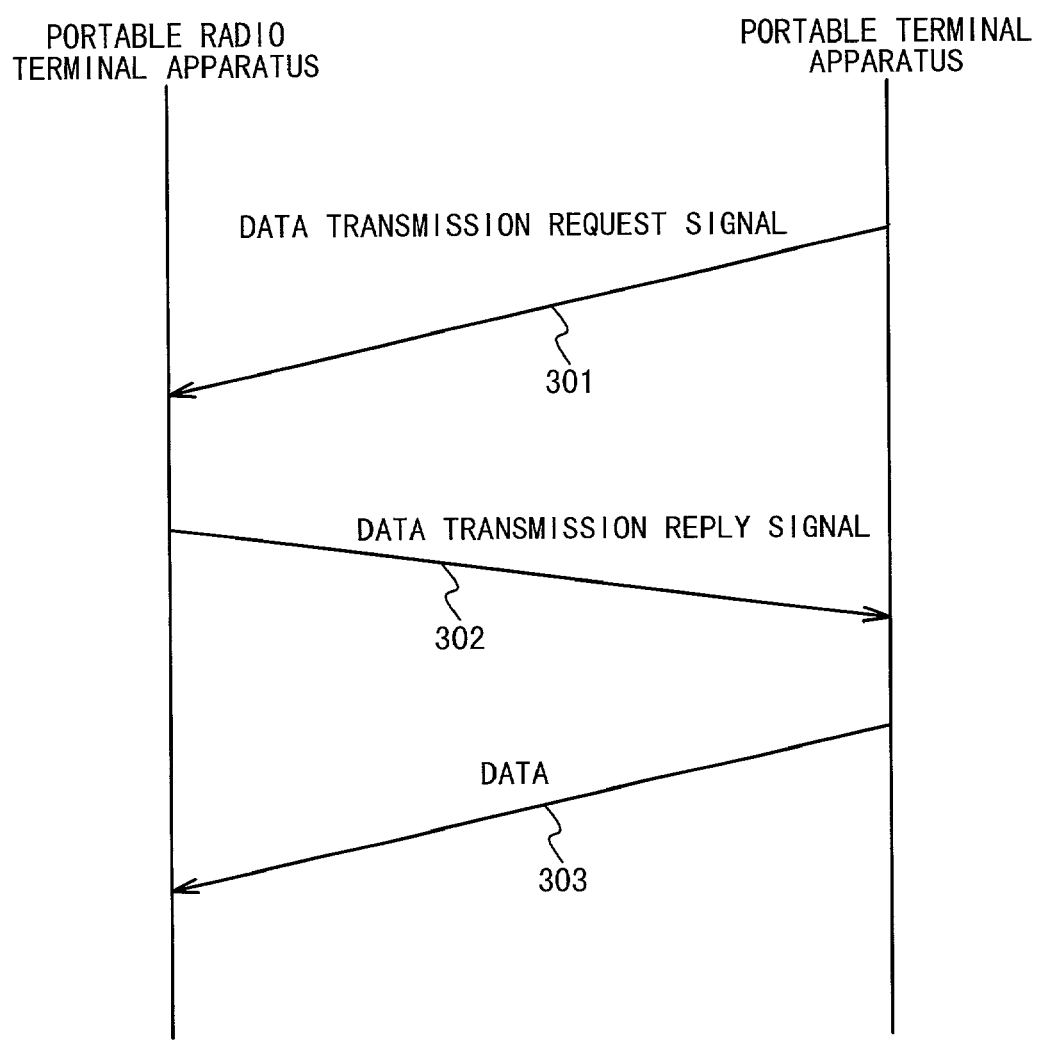
FIG. 3 is timing charts showing a sequence of data transmission between the mobile terminal apparatus and the radio mobile terminal apparatus of the present invention.

FIG. 3 shows a sequence of data transmission between the mobile terminal apparatus 100 and the radio mobile terminal apparatus 200 of the present invention.

First, a data transmission request signal 301 is transmitted from the mobile terminal apparatus 100 to the radio mobile terminal apparatus 200 to indicate the request of data transmission. The radio mobile terminal apparatus 200 transmits back a data transmission reply signal 302 as a reply signal to the received request signal. Next, the mobile terminal apparatus 100 starts the transmission of e-mails 303 after the reception of the data transmission reply signal.

Figure 4:
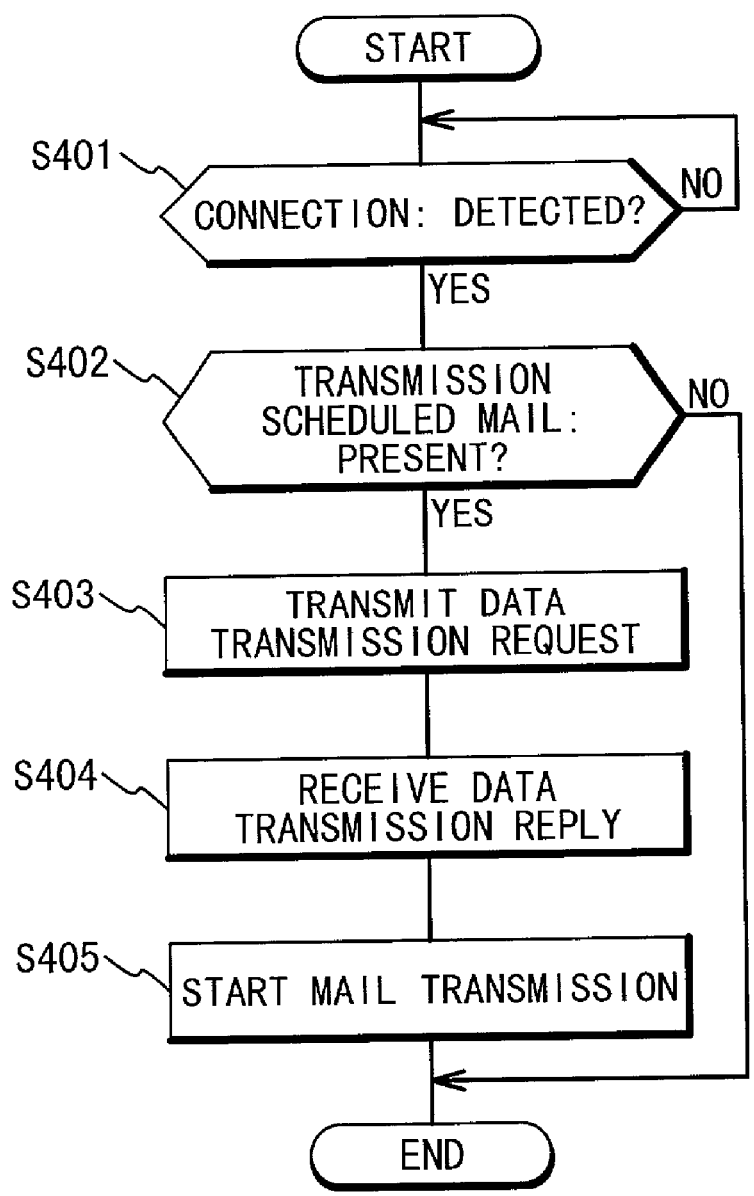
FIG. 4 is a flow chart showing the operation of a control unit of the mobile terminal apparatus when the radio mobile terminal apparatus is connected through a connector.

FIG. 4 shows the operation of the control unit 106 when the mobile terminal apparatus 100 of FIG. 1 and the radio mobile terminal apparatus 200 of the FIG. 2 are connected by the connector 107 and the connector 208. In the figure, S means a step.

First, when the connection detection signal is received from the connection detecting section 108 (S401), it is checked whether the e-mail data (transmission scheduled e-mail 1–N) of the transmission schedule attribute exists in the e-mail storage section 104 (S402). On the other hand, when the e-mail data of the transmission schedule attribute does not exist, the control procedure is ended. Also, when the e-mail data of the transmission schedule attribute exists, the control unit 106 transmits the data transmission request signal from the connector section 107 through the transmitting and receiving IF section 109 (S403). Moreover, when the transmitting and receiving IF section 109 receives the data transmission reply signal through the connector section 107 (S404), all of the e-mail data with the transmission schedule attribute stored in the e-mail storage section 104 are transmitted (S405).

In accordance with the procedure shown in FIG. 4, the mobile terminal apparatus 100 can transmit the e-mail data after preparation is finished on the side of the radio mobile terminal apparatus 200. Thus, the occurrence of data defect in the transmitted e-mail data can be prevented.

FIG. 5 shows the operation of the control unit 203 when the mobile terminal apparatus 100 is connected with the radio mobile terminal apparatus 200.

When receiving the data transmission request signal 301 from the mobile terminal apparatus 100 (S502) after the connection is detected by the connection detecting section 209 (S501), the radio mobile terminal apparatus 200 transmits the e-mail transmission reply signal 302 (S503). Thus, the transmission of the e-mail data is started from the mobile terminal apparatus 100 and is received by the radio mobile terminal apparatus 200. The received e-mail data are temporarily stored in the e-mail temporary storage section 211 (S504). Until reception of all the e-mail data ends, the processes of data reception and storage are continued (S505). When the reception of all the e-mail data ends, the e-mail data stored in the e-mail temporary storage section 211 are read out (S506) and transmitted to a mail server (S507). When the e-mail transmission to the mail server ends normally (S508), the e-mail is stored in the e-mail managing section 212 as the already transmitted e-mail (S509). When the e-mail transmission is extraordinarily ended due to a factor of electric wave situation, the e-mail is stored in the e-mail managing section 212 as the yet untransmitted e-mails (S510). When there is the next e-mail in the e-mail temporary storage section 211 (S510), the next e-mail is read out from the e-mail temporary storage section 211 (S512), and the transmission of this e-mail is carried out (S507). While the e-mails exist in the e-mail temporary storage section 211, the process from S507 to S512 is repeatedly executed, and the e-mail transmission process ends when all the e-mails in the e-mail temporary storage section 211 have been transmitted.

According to the process of FIG. 5, when the connection detection is determined, the transmission of the e-mail data is automatically started from the mobile terminal apparatus 100, and the e-mail data are stored in the e-mail temporary storage section 211 of the radio mobile terminal apparatus 200. When the reception ends, the e-mail transmission to the mail server is automatically started, if the electric wave situation is good. Thus, the transmission of the e-mail data from the mobile terminal apparatus to the radio mobile terminal apparatus and the e-mail transmission from the radio mobile terminal apparatus to the mail server are automatically carried out. Therefore, the key operation of the user can be omitted, and the convenience of the radio mobile terminal apparatus 200 and the mobile terminal apparatus 100 are improved.

Figure 6:
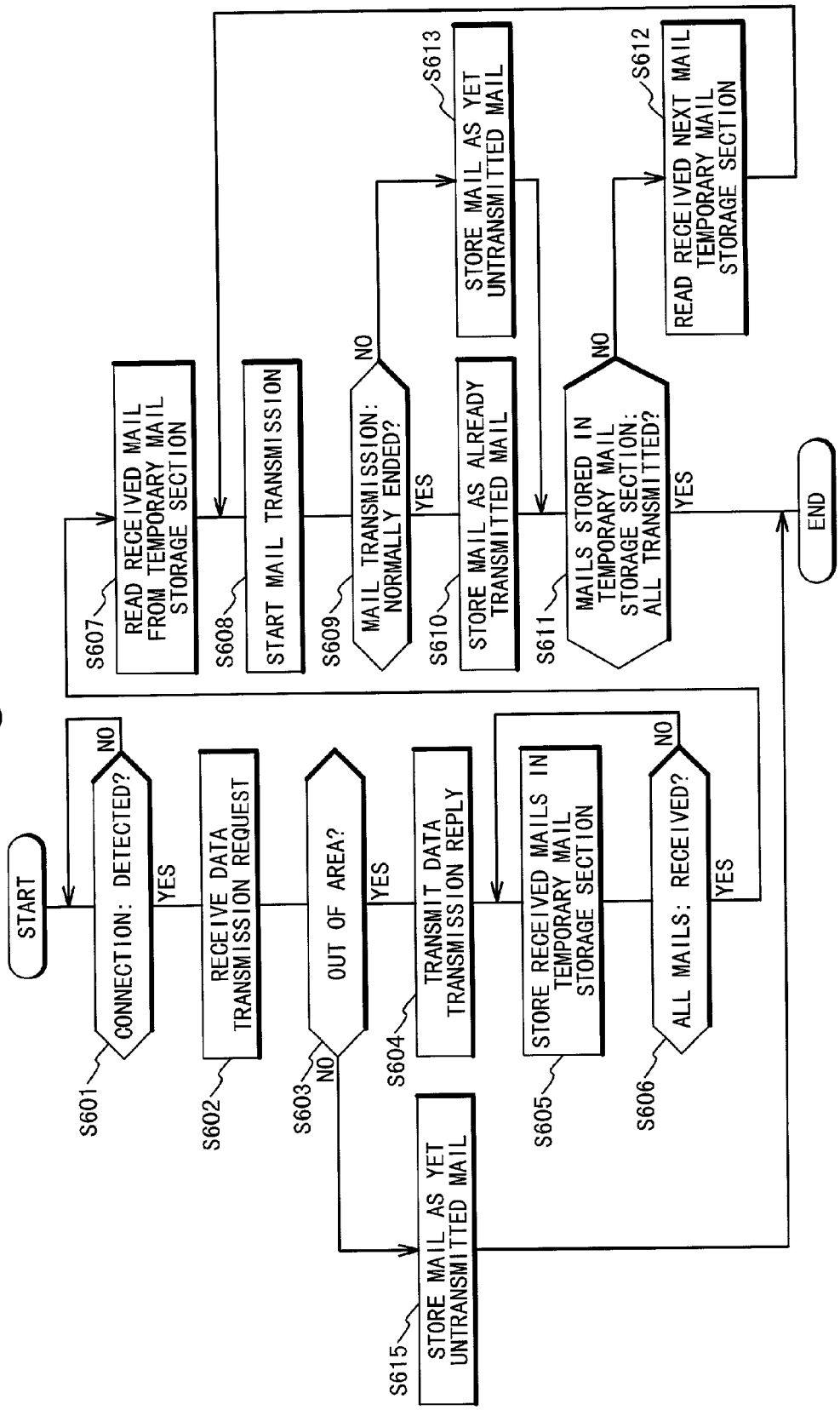
FIG. 6 is a flow chart showing another operation of the control unit of the radio mobile terminal apparatus when it is connected with the mobile terminal apparatus.

FIG. 6 shows another process example of the control unit 203 when the mobile terminal apparatus 100 is connected with the radio mobile terminal apparatus 200. Steps S607 to S613 in FIG. 6 correspond to S507 to S512 of FIG. 5 and these steps are identical. Therefore, the same description is omitted.

When receiving the data transmission request signal 301 from the mobile terminal apparatus 100 (S602) after the detection of the connection (S601), the control unit 203 of the radio mobile terminal apparatus 200 determines whether the radio mobile terminal apparatus 200 is in the service area or out of the service area based on the output of the out-of-area detecting section 205 (S603). In case of being in the service area, the e-mail transmission reply signal 302 is transmitted through the transmitting and receiving IF section 210 and the connector section 208 (S604). Hereinafter, the control procedure is the same as the procedure of S504 and subsequent steps. On the other hand, in case of being out of the service area, an e-mail transmission refusal signal is transmitted from the connector section 208 through the transmitting and receiving IF section 210 and the e-mail data is not received from the mobile terminal apparatus 100 (S613).

According to the process of FIG. 6, when the radio mobile terminal apparatus 200 is out of the service area, the e-mail cannot be transmitted at once. Therefore, when an e-mail data is transmitted from the mobile terminal apparatus 100, the available memory area is decreased and the use efficiency of the memory is lowered. However, the above-mentioned problem is improved if transmission data is inhibited when the radio mobile terminal apparatus is out of the service area.

Figure 7:
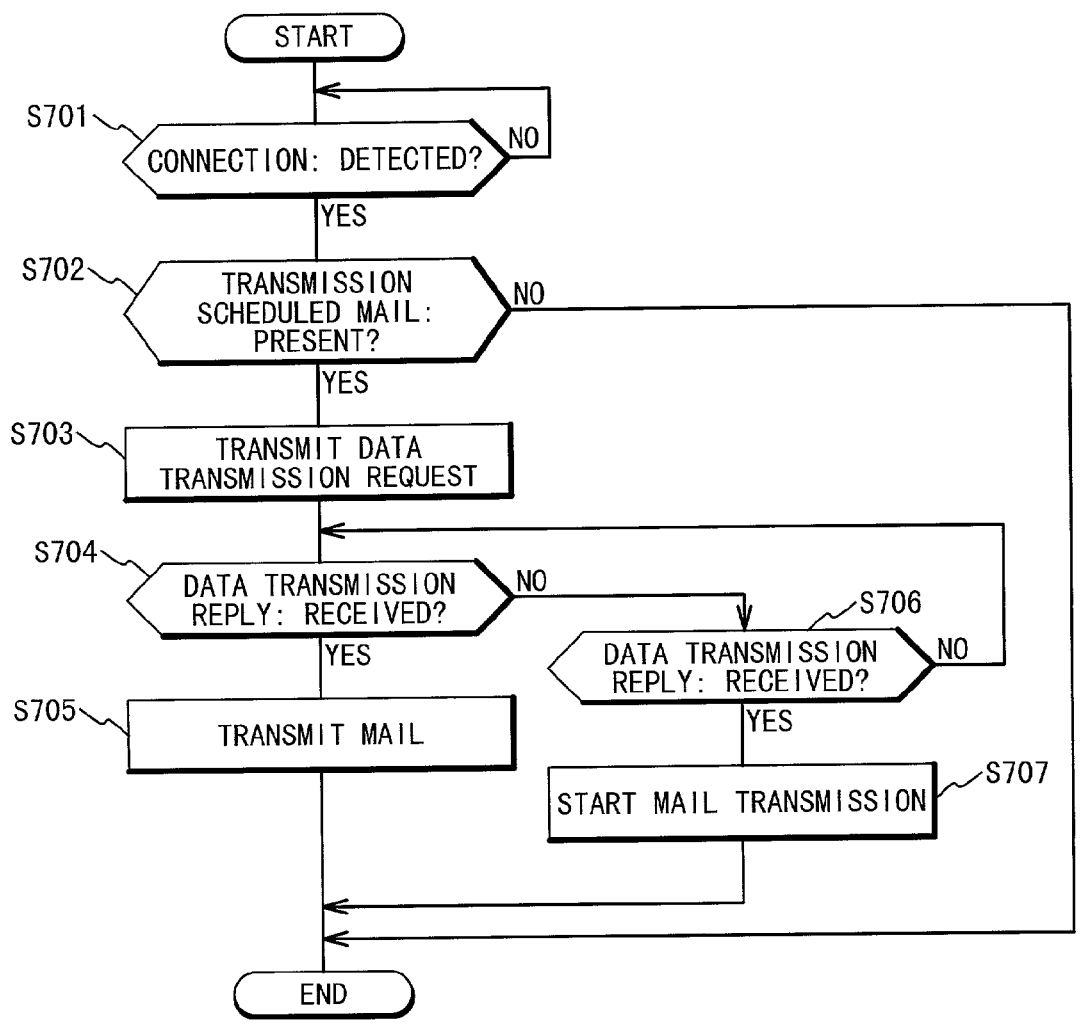
FIG. 7 is a flow chart showing the operation of the control unit of the mobile terminal apparatus corresponding to the operation of FIG. 6.

FIG. 7 shows the process of the control unit 103 in the data transmission from the mobile terminal apparatus 100 to the radio mobile terminal apparatus 200 which corresponds to the process of FIG. 6. The description of the same portions of FIG. 7 as those of FIG. 4 are omitted, and the portion which is different from FIG. 4 is described. When receiving the data transmission reply signal (S705) after transmitting the data transmission request signal at S703, the transmission of the e-mails is started (S704). When the data transmission refusal signal is received (S706), the transmission of the e-mails is not carried out (S707).

According to the process of FIG. 7, when the radio mobile terminal apparatus 200 is out of the service area and cannot transmit the e-mails to the mail server, the transmission of the e-mails from the mobile terminal apparatus 100 is inhibited. Thus, it is possible to prevent the accumulation of the yet untransmitted e-mail data in the radio mobile terminal apparatus 200.

In the above embodiment, it is supposed that the connection of the mobile terminal apparatus 100 and the radio mobile terminal apparatus 200 is achieved using the connector sections 107 and 208. However, another connection means may be employed with contact or with no contact. For example, the connection means of a non-contact system (wireless system) using infrared rays, visible ray, feeble electric wave, or supersonic wave may be employed. In this case, the connection detection is carried out by not mechanical or electric connection but a connection request and its reply.

Also, even when the connector sections 107 and 208 are used for the connection, the structure in which the connectors are fixed to the main bodies may be used. Instead, the structure in which one of the connectors is fixed to the main body, and the other connector provided in an end portion of a cable which is always connected with the other main body.

Moreover, a PDA is shown as the external apparatus or the mobile terminal apparatus, but the present invention is not limited to the PDA. For example, a personal computer may be used.

As seen from the above, according to the e-mail transmitting method of the present invention, when the radio mobile terminal apparatus and the mobile terminal apparatus are connected through the connection means, the e-mail data are automatically transmitted from the mobile terminal apparatus to the radio mobile terminal apparatus, when the connection is detected. Also, the e-mail data received from the mobile terminal apparatus are automatically transmitted from the radio mobile terminal apparatus to the mail server. Therefore, the user operation is not almost needed, and the troublesome operation in the e-mail transmission is eliminated and it becomes possible to carry out the e-mail transmission simply and easily.

Also, according to the radio mobile terminal apparatus of the present invention, the radio mobile terminal apparatus is composed of the connection means, the detecting section, the communication means, the memory means and the control means, and when connection with an external apparatus through the connection means is detected, the transmission of e-mail data from the external apparatus is permitted. Also, when the e-mail data are automatically transmitted to the mail server when the reception of the e-mail data is completed. Therefore, the user operation is not almost needed, and the troublesome operation in the e-mail transmission is eliminated. Thus, the operation convenience of the radio mobile terminal apparatus can be improved.

Moreover, according to the mobile terminal apparatus of the present invention, the mobile terminal apparatus is composed of the e-mail data producing function, the communication function, the memory means, the connection means and the detecting means, and when the establishment of the connection is detected by the detecting means, and a reply is returned to the data transmission request which has transmitted to the radio mobile terminal apparatus, the control means is provided for to automatically transmit the e-mail data stored in the memory means. Therefore, the processing of the e-mail transmission (transfer) can be automated, in case of the connection with the radio mobile terminal apparatus. Also, the troublesome operation in the e-mail transmission is eliminated, and the operation convenience of the radio mobile terminal apparatus can be improved.

What is claimed is:

1. An e-mail transmitting method comprising the steps of:
    (a) operatively connecting a radio mobile terminal apparatus and a mobile terminal apparatus to establish a communication channel therebetween, said radio mobile terminal apparatus having a radio communication function;
    (b) detecting the establishment of said communication channel between said mobile terminal apparatus and said radio mobile terminal apparatus;
    (c) automatically transmitting transmission scheduled e-mails produced in said mobile terminal apparatus, from said mobile terminal apparatus to said radio mobile terminal apparatus through said communication channel in response to the detection of the establishment of said communication channel, wherein said step of automatically transmitting transmission scheduled e-mails produced in said mobile terminal apparatus includes the steps of
    transmitting a request signal from said mobile terminal apparatus to said radio mobile terminal appartus in response to the detection of the establishment of said communication channel;
    transmitting an acceptance reply from said radio mobile terminal apparatus to said mobile terminal apparatus in response to reception of the request; and
    automatically transmitting said transmission scheduled e-mails from said mobile terminal apparatus to said radio mobile terminal apparatus; and
    (d) automatically transmitting said transmission scheduled e-mails received from said mobile terminal apparatus, from said radio mobile terminal apparatus to a mail server through a base station using said radio communication function.

2. The e-mail transmitting method according to claim 1, wherein said (a) connecting step comprises the step of:

operatively connecting said radio mobile terminal apparatus and said mobile terminal apparatus by connectors directly or through a cable or with no contact.

3. The e-mail transmitting method according to claim 1, wherein said communication channel is one of a radio channel, an infrared ray channel, a visible light beam channel, a supersonic wave channel.

4. The e-mail transmitting method according to claim 1, wherein said transmitting an acceptance reply from said radio mobile terminal apparatus to said mobile terminal apparatus in response to reception of the request comprises the steps of:
 checking whether said radio mobile terminal apparatus is in a service area of said base station; and
 transmitting the acceptance reply from said radio mobile terminal apparatus to said mobile terminal apparatus in response to reception of the request, when it is determined that said radio mobile terminal apparatus is in a service area of said base station.

5. The e-mail transmitting method according to claim 4, wherein said transmitting an acceptance reply from said radio mobile terminal apparatus to said mobile terminal apparatus in response to reception of the request further comprises the steps of:
 transmitting a refusal replay from said radio mobile terminal apparatus to said mobile terminal apparatus in response to the reception of the request, when it is determined that said radio mobile terminal apparatus is not in a service area of said base station; and
 stopping the transmission of said transmission scheduled e-mails from said mobile terminal apparatus to said radio mobile terminal apparatus.

6. The e-mail transmitting method according to claim 1, wherein said (d) automatically transmitting said received transmission scheduled e-mails further comprises the step of:
 storing said received transmission scheduled e-mails in said radio mobile terminal apparatus.

7. A mobile terminal apparatus comprising:
 a coupling device which operatively connects said mobile terminal apparatus with a radio mobile terminal apparatus such that a communication channel is established between said radio mobile terminal and said mobile terminal apparatus;
 a detecting unit which detects the establishment of said communication channel between said radio mobile terminal apparatus and said mobile terminal apparatus;
 a first communication section which communicates with said mobile terminal apparatus through said communication channel;
 a memory which stores e-mails;
 a key operation section which inputs characters; and
 a control unit which produces each of e-mails based on characters and storing the produced e-mails in said memory as transmission scheduled e-mails, and automatically reads out said transmission scheduled e-mails from said memory to transmit to said radio mobile terminal apparatus when the establishment of said communication channel is detected by said detecting unit, and a reply to a request is returned from said radio mobile terminal apparatus, said request having been transmitted from said mobile terminal apparatus to said radio mobile terminal apparatus, and wherein said control unit stops the transmission of said transmission scheduled e-mails when the reply is not returned from said radio mobile terminal apparatus.

8. The mobile terminal apparatus according to claim 7, wherein said communication channel is one of a radio channel, an infrared ray channel, a visible light beam channel, a supersonic wave channel.

* * * * *